T. V. EDMUNDS.
PUNCTURE PREVENTING MATERIAL FOR TIRES.
APPLICATION FILED FEB. 12, 1918.
1,322,550.
Patented Nov. 25, 1919.
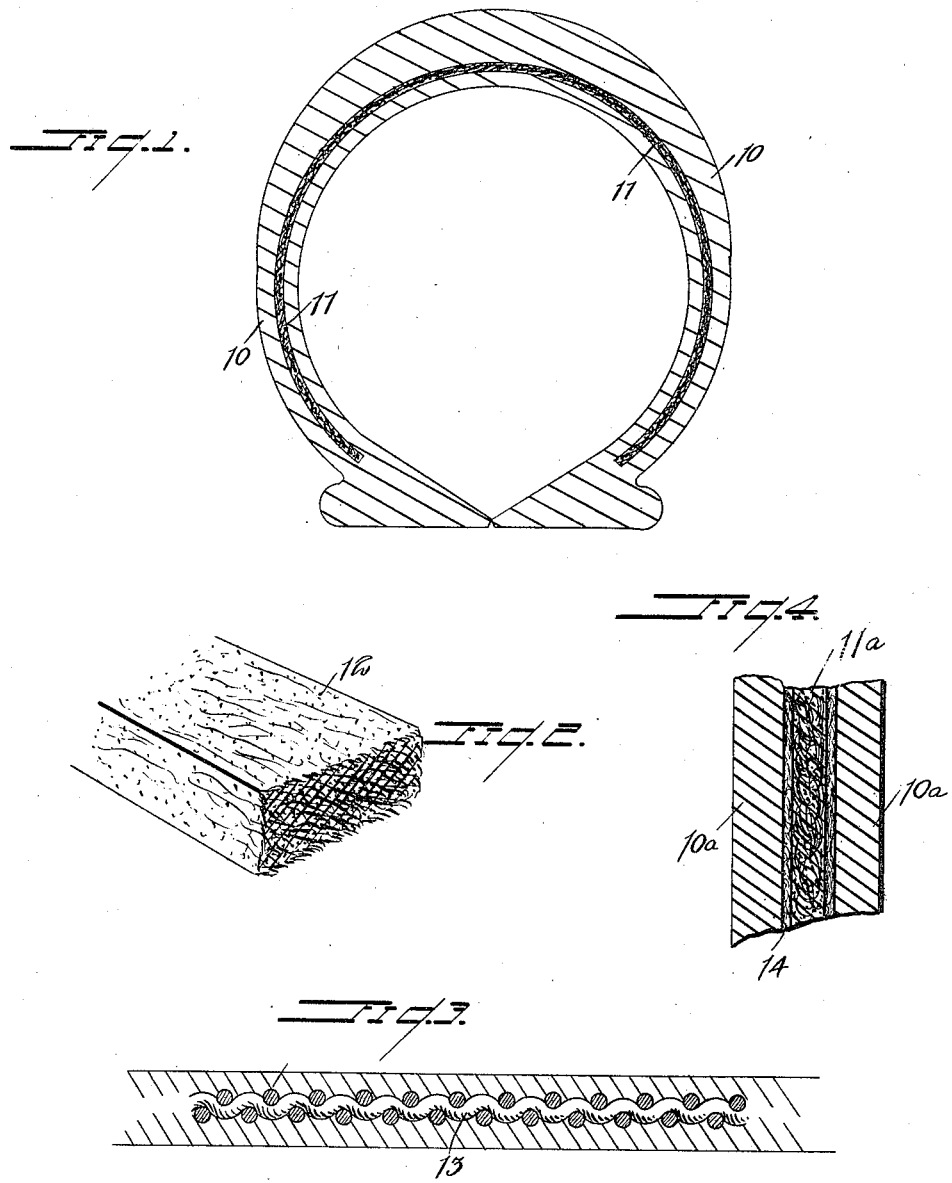
WITNESSES
INVENTOR
THOMAS V. EDMUNDS,
BY
ATTORNEYS

UNITED STATES PATENT OFFICE.

THOMAS VENABLE EDMUNDS, OF WINSTON-SALEM, NORTH CAROLINA, ASSIGNOR OF ONE-HALF TO RAYMOND G. PARKER.

PUNCTURE-PREVENTING MATERIAL FOR TIRES.

1,322,550.     Specification of Letters Patent.     Patented Nov. 25, 1919.

Application filed February 12, 1918. Serial No. 216,744.

*To all whom it may concern:*

Be it known that I, THOMAS V. EDMUNDS, a citizen of the United States, and a resident of Winston-Salem, in the county of Forsyth, State of North Carolina, have invented a new and useful Improvement in Puncture-Preventing Materials for Tires, of which the following is a specification.

My present invention relates particularly to a composite material to render automobile and other pneumatic tires practically puncture proof, without giving rise to other and even more serious objections, such as overheating and undue wear and deterioration.

While susceptible of use for various purposes, the primary object of my invention resides in its application to pneumatic tires for the purposes above stated. For these same purposes, numerous materials have been before proposed, but their use has brought about disadvantages in practice equally as serious as the dangers of punctures.

The material proposed by my invention is not only highly desirable as a puncture resistant, but even when compressed or woven, is readily flexible so as to yield with the tire movements, and particularly adaptable to receive and retain a lubricant, whereby to avoid the overheating through friction.

More specifically, my invention proposes the use of metallic wool, matted, woven or compressed, with graphite, and either with or without opposite layers of asbestos for heat insulation, as will be seen be reference to the accompanying drawings, forming a part of this specification, and wherein:

Figure 1 is a cross section through a portion of a pneumatic tire showing the material insert as proposed by my invention.

Fig. 2 is a detail perspective view of a portion of the metallic wool and graphite layer, the wool being simply matted, with or without compression.

Fig. 3 is a sectional view through the material in woven form, with the graphite between and upon opposite sides of the woven strands; and Fig. 4 is a enlarged section of a portion of Fig. 1, illustrating a slightly modified form including opposite layers of heat insulating material.

Referring now to these figures, I have shown in Fig. 1 a pneumatic tire generally indicated at 10, between the inner and outer surfaces of which and around the major portion of the same, is an insert 11 of the material constituting my invention, said material consisting of metallic wool, matted with or without compression as seen at 12 in Fig. 2, or woven after stranding, as seen at 13 in Fig. 3, said wool in either form, being impregnated with graphite, which it is adapted to effectively receive and retain, in order to prevent undue friction, not only between the strands of wool, but between the wool and the adjacent portion of the tire.

In Fig. 4, a portion of the wall of a tire is seen at $10^a$, with an insert $11^a$ of metallic wool and graphite, upon opposite sides of which insert are layers 14 of asbestos, in order to further prevent communication of any heat arising from friction, to the adjacent portion of the tire, which might otherwise bring about undue wear and deterioration of the latter.

I claim:—

1. A puncture preventing material for tires consisting of an inner layer of metallic wool and graphite, and outer layers of asbestos.

2. A tire having incorporated therein, spaced inner and outer layers of asbestos, and a layer of metallic wool impregnated with graphite between the said asbestos layers.

THOMAS VENABLE EDMUNDS.

Witnesses:
R. I. DALTON,
C. E. JOHNSON.